(12) United States Patent
Holdsworth

(10) Patent No.: US 6,202,282 B1
(45) Date of Patent: Mar. 20, 2001

(54) METHOD OF MAKING A TUBULAR COUPLER FOR CONCRETE REINFORCING BARS

(75) Inventor: Steven E. Holdsworth, Centerville, OH (US)

(73) Assignee: Barsplice Products, Inc., Beavercreek, OH (US)

( * ) Notice: Subject to any disclaimer, the term of this patent is extended or adjusted under 35 U.S.C. 154(b) by 0 days.

(21) Appl. No.: 09/327,221

(22) Filed: Jun. 7, 1999

Related U.S. Application Data

(60) Division of application No. 08/925,840, filed on Sep. 8, 1997, now Pat. No. 5,909,980, which is a continuation-in-part of application No. 08/668,419, filed on Jun. 17, 1996, now Pat. No. 5,664,902, which is a continuation of application No. 08/378,484, filed on Jan. 26, 1995, now abandoned.

(51) Int. Cl.$^7$ .................................................. B21D 39/00
(52) U.S. Cl. ........................... 29/456; 403/362; 52/726.1
(58) Field of Search .............................. 29/432, 525, 716, 29/798, 456; 403/362, 265, 266, 267, 305, 13; 52/726.1; 227/19

(56) References Cited

U.S. PATENT DOCUMENTS

| 197,509 | 11/1877 | Abbott . |
| 2,938,698 | 5/1960 | Johnson . |
| 3,415,552 | 12/1968 | Howlett . |
| 3,551,999 | 1/1971 | Gutmann . |
| 4,040,757 | 8/1977 | Pauli . |
| 4,241,490 | 12/1980 | Edwards . |
| 4,314,771 | 2/1982 | Lambert . |
| 4,666,326 | 5/1987 | Hope . |
| 5,046,878 | * 9/1991 | Young .................................... 403/13 |
| 5,419,217 | 5/1995 | Umezawa et al. . |
| 5,468,524 | 11/1995 | Albrigo et al. . |
| 5,681,126 | 10/1997 | Lin . |
| 5,689,923 | 11/1997 | Winkeljann et al. . |
| 5,797,696 | * 8/1998 | Baynes et al. ....................... 403/337 |

* cited by examiner

*Primary Examiner*—S. Thomas Hughes
*Assistant Examiner*—John C. Hong
(74) *Attorney, Agent, or Firm*—Jacox, Meckstroth & Jenkins

(57) ABSTRACT

An elongated tubular metal body includes a longitudinally extending wedge portion having converging inner wedging surfaces defining an included angle of less than seventy degrees for receiving the end portions of concrete reinforcing bars. A series of longitudinally spaced threaded holes are formed within the tubular body in opposing relation to the wedge portion, and a socket head set screw or a shear head screw is threaded into each hole. The screws have conical pointed tips for penetrating a bar when the screws are tightened to a predetermined torque, and the screws force the outer ribs on the bar into the tubular body. In one embodiment, a section of cylindrical seamless tubing of ductile steel is cold-forged or deformed within a die set to form the tubular body with a generally diamond-shaped cross-sectional configuration. In another embodiment, the tubular steel body has thicker wall portions in the areas of the wedging surfaces and threaded holes and defines a chamber having a clover leaf cross-sectional configuration.

14 Claims, 2 Drawing Sheets

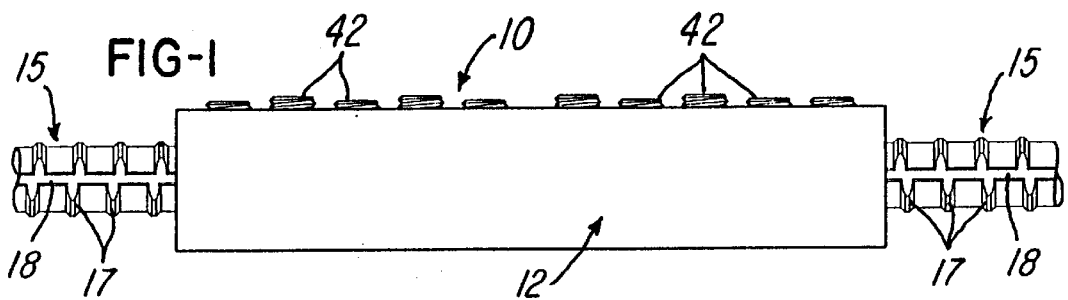
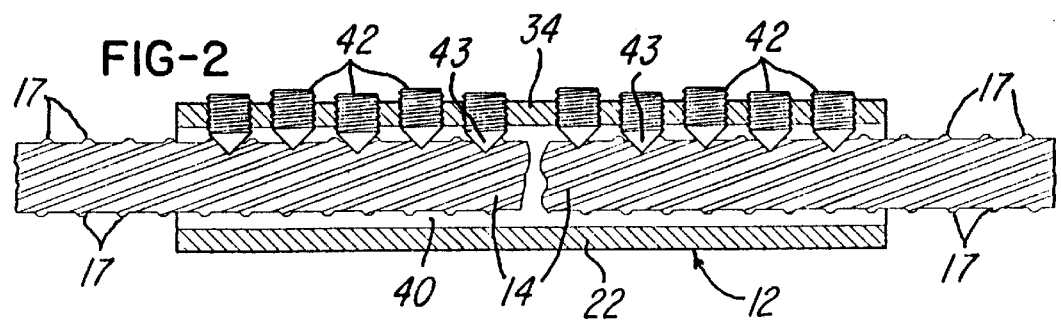
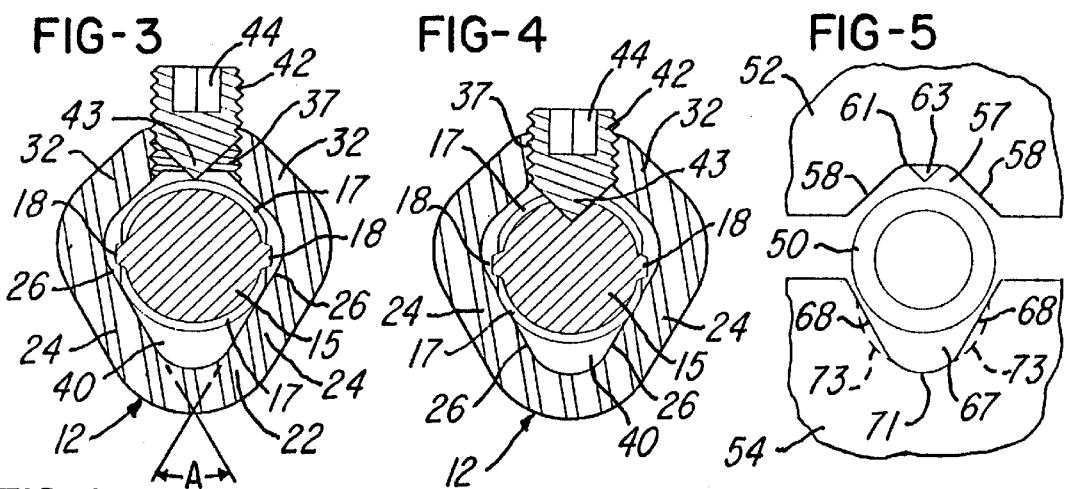
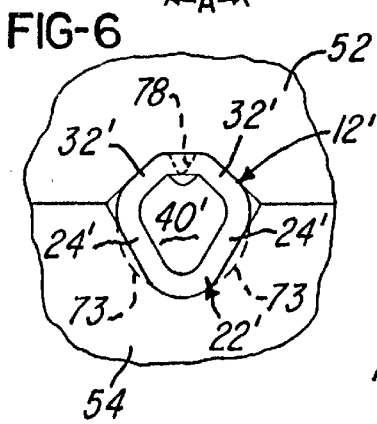
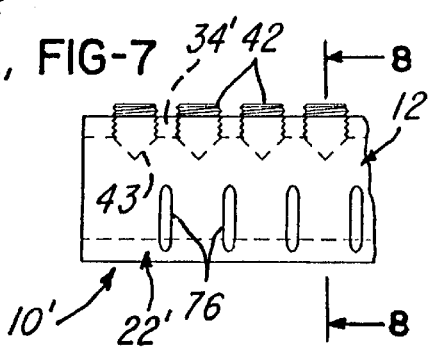
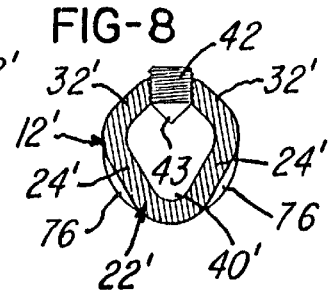

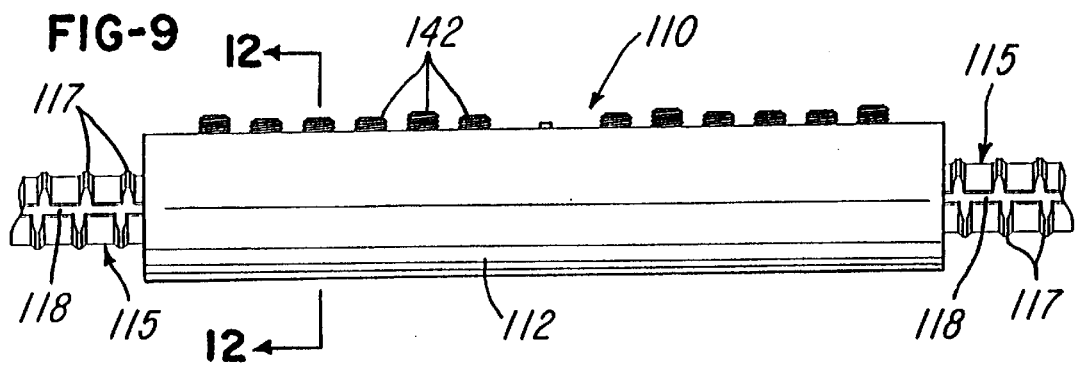
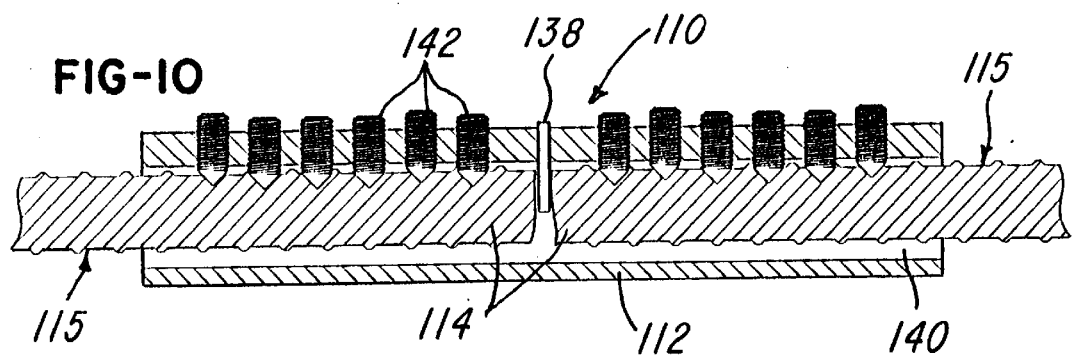
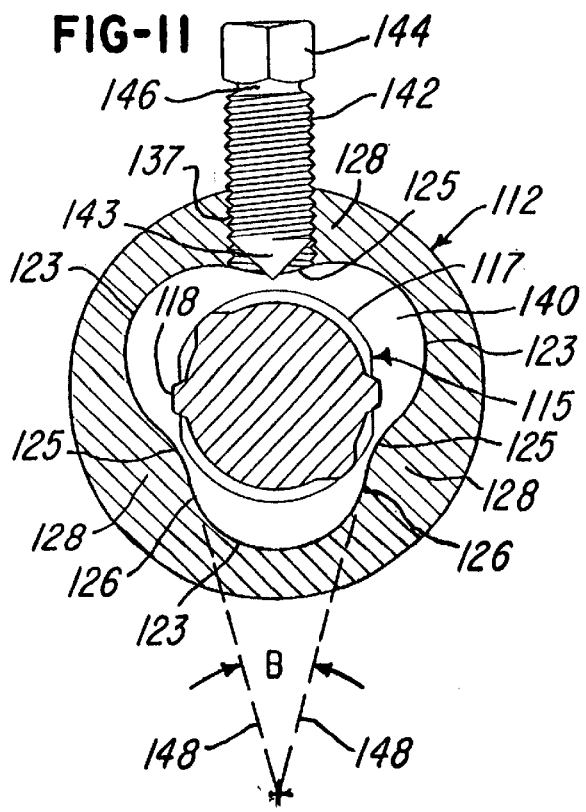
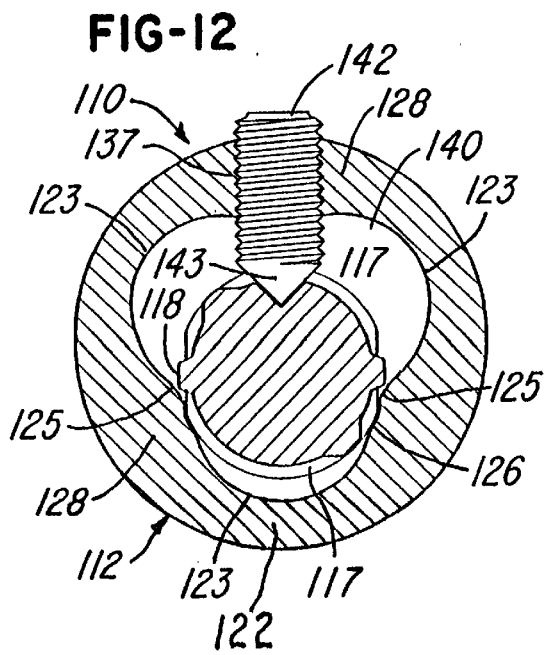

METHOD OF MAKING A TUBULAR COUPLER FOR CONCRETE REINFORCING BARS

RELATED APPLICATIONS

This application is a division of U.S. application Ser. No. 08/925,840, filed Sep. 8, 1997, U.S. Pat. No. 5,909,980, which is a continuation in part of U.S. application Ser. No. 08/668,419, filed Jun. 17, 1996, U.S. Pat. No. 5,664,902, which is a continuation of U.S. application Ser. No. 08/378,484, filed Jan. 26, 1995, abandoned.

BACKGROUND OF THE INVENTION

In the art of joining the adjacent end portions of two generally aligned concrete reinforcing bars or "rebars", it is known to use a tubular steel coupling body or sleeve which receives the end portions of the bars. The coupling sleeve is crimped or swaged with substantial force against the reinforcing bars with the aid of a hydraulically actuated press and die set, for example, as disclosed in U.S. Pat. Nos. 3,551,999 and 4,241,490. It is also known to form tapered or non-tapered threads on the end portions of each reinforcing bar, and to join the end portions together with a coupling sleeve having internal tapered or non-tapered threads, for example, as disclosed in U.S. Pat. Nos. 197,509 and 3,415,552.

In order to avoid the need for a hydraulically actuated press, a hydraulic pump and power source and a crimping die set, or to avoid the threading operation and protection of the threaded end portions of the reinforcing bars, it is also known to use a tubular coupler sleeve with longitudinally spaced and radially extending screws. According to one coupler as disclosed in U.S. Pat. Nos. 4,666,326 and 5,046,878, each of the screws has a hex shaped outer end portion and a threaded inner portion integrally connected by a reduced neck portion. The screws are tightened through the coupling sleeve into the reinforcing bars until the torque is sufficient to shear the hexagonal head portions from the threaded inner portions at the neck portions generally flush with the outer surface of the sleeve. This tubular coupling sleeve is also provided with a pair of elongated racks or hardened strips with inwardly and outwardly projecting teeth, and the ends of the strips are welded to the coupling sleeve. It has also been proposed to inject an epoxy material into these coupling sleeves after the screws are tightened for further increasing the gripping strength of the coupler sleeve with the opposing end portions of the connected reinforcing bars.

The forming of threads on the end portions of the reinforcing bars and the protection of the threads during handling and shipping of the bars add significantly to the cost of the reinforcing bars. In addition, the forming of internal threads within the tubular coupling sleeve adds to the cost of the coupling sleeve. In regard to the above described coupler with inner strips having teeth, the use of longitudinally spaced special screws increases the cost of the coupling sleeve, and the cost of the sleeve is further increased by the cost of forming the internal hardened strips with teeth on opposite sides and the cost for welding the strips within the coupling sleeve. Also, during installation, the strips of teeth sometimes bind upon the reinforcing bars as they are being inserted. This difficulty creates additional field labor. Further, once the heads of the special screws have been sheared off there is no provision to loosen the screws to reposition the coupler if it has been misinstalled. Another problem with special screws is that if the screws are not precisely formed, they are sometimes unreliable because the heads do not shear off at the prescribed torque.

Another form of tubular coupling with longitudinally spaced radial screws is disclosed in U.S. Pat. No. 4,314,771. However, this coupling sleeve is designed for connecting the opposing end portions of rods or shafts which do not require a high strength connection of the rods or shafts, as is required when joining reinforcing bars.

SUMMARY OF THE INVENTION

The present invention is directed to an improved and relatively inexpensive tubular coupler for positively coupling the adjacent end portions of two concrete reinforcing bars, and which coupler provides a high tensile strength which is equal to or greater than the tensile strength of the reinforcing bar or exceeds other strength requirements for reinforcing bar connections which may be mandated by building codes. The coupler of the invention is also adapted to be installed in the field without the need for power operated presses or special equipment and without the need for preparing or threading the end portions of the reinforcing bars. Additionally, the coupler is designed for sliding smoothly onto the reinforcing bars.

In accordance with one embodiment of the invention, a tubular coupler sleeve or body is produced by deforming or cold forging a section of generally seamless cylindrical tubing of ductile steel to provide the body with a generally diamond-shaped cross-sectional configuration. The coupler body includes a longitudinally extending wedge portion having converging inner surfaces disposed at an included angle of about 60°. Thus when an end portion of a reinforcing rod is inserted into the tubular body, the circumferential ribs on the bar engage the inner surfaces of the wedge portion. Longitudinally spaced threaded holes are formed within the tubular body in opposing relation to the wedge portion of the body, and a standard socket head and cone point set screw is threaded into each hole.

In accordance with another embodiment of the invention, the tubular coupler sleeve or body is formed by extruding or cold-drawing a steel tube so that the body has a generally cylindrical outer surface and an inner chamber defined by three uniformly spaced part-cylindrical concave surfaces connected by three convex surfaces to form a clover leaf cross-sectional configuration. The part-cylindrical concave surfaces have a radius which is generally about 70% to 90% of the radius of the concrete reinforcing bar to provide the body with a wedging portion with longitudinally extending and opposing wedging seats or surfaces which receive the ribs on the reinforcing bar. The cross-sectional configuration of the tubular body also provides the body with portions having a heavier wall thickness where desirable. That is, the thicker wall portions form the wedging surfaces and the opposing portion where threaded holes are formed for receiving corresponding locking screws having pointed ends for penetrating and deforming the reinforcing bar. In this embodiment, the locking screws have hexagonal head portions which shear from the threaded portion of the screw in response to a predetermined torque up to several hundred foot pounds.

When the locking screws are tightened against a reinforcing bar to a prescribed or preset torque, depending upon the size of the reinforcing bar, the conical or pointed tips of the screws penetrate the reinforcing bar and also force the circumferential ribs on the reinforcing bar into the inner wedging surfaces of the wedge portion. This forms a positive lock of the coupler body onto the end portion of the reinforcing bar. The penetration of the circumferential ribs into the wedge portion of the coupler body, and the penetration of the cone point screws into the reinforcing bar, result in forming a connection or coupling with a tensile strength higher than the tensile strength of the reinforcing bar or higher than the building code requirements to which the coupler is designed. The coupler of the invention is also economical to produce and may be provided with longitudinally spaced and outwardly projecting ribs which cooperate to provide interlocking of the body with surrounding concrete.

Other features and advantages of the invention will be apparent from the following description, the accompanying drawings and the appended claims.

BRIEF DESCRIPTION OF THE DRAWINGS

FIG. 1 is an elevational view of a coupler constructed in accordance with the invention and shown assembled for positively connecting the adjacent end portions of two concrete reinforcing bars;

FIG. 2 is an axial section of the coupler and the end portion of the reinforcing bars shown in FIG. 1 and with a row of locking or set screws shown in elevation;

FIG. 3 is an enlarged cross-section of the coupler and a reinforcing bar before the locking screws are tightened;

FIG. 4 is a cross-section similar to FIG. 3 and showing the coupler and reinforcing bar after the locking screws have been fully tightened;

FIG. 5 is a fragmentary view of a die set used in the manufacture of the coupler body for deforming a section of cylindrical steel tubing into a coupler body;

FIG. 6 is a fragmentary view similar to FIG. 5 and showing the die set in its closed position to deform the cylindrical tubing section into the tubular coupler body;

FIG. 7 is a fragmentary elevational view of a coupler formed by the die set in accordance with a modification of the invention to provide interlocking ribs which mechanically bond with the concrete;

FIG. 8 is a cross-section of the modified coupler, taken generally on the line 8—8 of FIG. 7.

FIG. 9 is an elevational view, similar to FIG. 1, of a coupler constructed in accordance with the modification of the invention;

FIG. 10 is an axial section of the coupler shown in FIG. 9 and similar to FIG. 2;

FIG. 11 is an enlarged cross-section of the coupler shown in FIGS. 9 and 10 and similar to FIG. 3 before the locking screws are tightened; and FIG. 12 is a cross-section similar to FIG. 11 and taken generally on the line 12—12 of FIG. 9 to show the coupler after the locking screws have been tightened into a reinforcing bar.

DESCRIPTION OF THE PREFERRED EMBODIMENTS

FIG. 1 illustrates a coupler 10 constructed in accordance with the invention and which includes an elongated tubular body 12 constructed from ductile seamless steel tubing, preferably Grade 1018, but steel grades 1012 through 1026 are also appropriate with selected mechanical properties. The coupler 10 forms a high strength rigid connection between the adjacent end portions 14 (FIG. 2) of a pair of concrete reinforcing bars 15. Each of the bars 15 has longitudinally spaced and circumferentially extending ribs 17 and also a pair of longitudinally extending and diametrically opposite ribs 18 which generally intersect the ends of the circumferential ribs 17.

As shown in FIG. 3, the tubular body 12 has a generally diamond-shaped cross-sectional configuration and includes a longitudinally extending V-shaped wedge portion 22 formed by generally flat wall portions 24 with corresponding inner wedging surfaces 26. The surfaces 26 form a V-shaped trough and define an included angle A between 50 degrees and 70 degrees and preferably about 60 degrees.

The tubular body 12 also includes a pair of longitudinally extending and generally flat walls 32 which are integrally connected by a generally flat wall 34 (FIG. 2) in which is formed a row or series of axially or longitudinally spaced threaded holes 37. The walls 32 and 34 also form a generally V-shaped cross-sectional configuration and oppose the V-shaped wedge portion 22 of the coupler body 12. As shown in FIG. 3, the tubular body 12 defines an internal diamond-shaped chamber 40 which is sufficiently large to receive freely the opposing end portions 14 of the reinforcing bars 15.

A series of standard or commercially available socket head and cone point set screws 42 are threaded into the corresponding holes 37, and each of the screws 42 has a pointed tip portion 43 and a hexagonal recess 44. As shown in FIGS. 2 and 4, after the end portions of the reinforcing bars 15 are inserted into opposite ends of the coupler body 12, the screws 42 are firmly tightened to move the screws from their retractive positions (FIG. 3) to their bar engaging positions (FIGS. 2 and 4). When the screws are tightened with a predetermined torque, for example, on the order of 50 to 200 foot-pounds by a preset torque wrench, the pointed tips 43 of the hardened screws penetrate into the bars 15 (FIG. 4). In addition, the force exerted by the screws 42 on the bars 15 causes the circumferential ribs 17 of the bars 15 to penetrate into and deform the surfaces 26 of the wedge portion 22 of the softer coupler body 12. As a result of this engagement of the ribs 17 with the wedge portion 22 and the engagement of the screws 42 with the bars 15, the coupler 10 produces a substantially high strength connection of the two bars 15. For example, when an assembled coupler and bars are tested under tensile loading, it has been found that one of the bars 15 is capable of breaking before either bar 15 is pulled from the coupler body 12.

The coupler body 12 may be constructed or formed in various sizes, for example, for receiving bar sizes having a nominal diameter of 0.5" (#4 bar size) to a nominal diameter of 1.41" (#11 bar size). Preferably, the body 12 is formed from cylindrical seamless tubing of relatively soft ductile steel such as Grade 1018. In such a case, a section 50 of the seamless steel tubing having a predetermined length, is placed between a set of die members 52 and 54 secured to the corresponding platens of a mechanical or hydraulic press (not shown). The die member 52 has an elongated cavity 57 defined by flat surfaces 58 arranged to define at included angle therebetween of about 90 degrees. The surfaces 58 are connected by a flat surface 61, and a series of conical projections 63 extend into the cavity 57.

The die member 54 has an elongated cavity 67 which is defined by a pair of flat surfaces 68 which define an included angle therebetween of about 60 degrees. A curved inner surface 71 connects the surfaces 68. The die member 54 may also be provided with a series of longitudinally spaced arcuate slots 73 within each of the surfaces 68, although such slots were not used to produce the coupler body 12.

When the die members 52 and 54 are closed, the tubing section 50 is cold-forged or deformed into a coupler body 12' which has essentially the same cross-sectional configuration as the coupler body 12 and is therefore described with the same reference numbers but with the addition of prime marks, including flat walls 32' and chamber 40'. In addition, the coupler body 12' has a series of longitudinally spaced ribs 76 which project outwardly from each side wall 24' of the wedge portion 22'. The ribs 76 cooperate with the non-cylindrical configuration of the coupler body 12' to help provide a positive interlock between the coupler body 12' and the concrete surrounding the coupler. As also shown in FIG. 5, the projections 63 within the die member 52 produce a series of longitudinally spaced conical recesses 78 (FIG. 6) within the top wall 34' (FIG. 7) of the body 12'. These recesses are used as pilot holes for the drilling and tapping of the threaded holes 37 for receiving the locking screws 42.

Referring to FIGS. 9–12 which show a modified coupling constructed in accordance with another embodiment of the invention, a coupler 110 is constructed similar to the coupler 10 and has corresponding components and portions which are identified with corresponding reference numbers but with the addition of "100" to each of the reference numbers used above in describing the embodiment of FIGS. 1–4. Accordingly, the coupler 110 has an elongated tubular body 112 which has an outer cylindrical surface and is formed by cold-drawing or extruding a steel material such as cold-drawn 1026 steel. The coupler 110 effectively connects the opposing end portions 114 of two aligned reinforcing bars 115 each having circumferentially extending and axially spaced ribs 117 and a pair of diametrically opposed and longitudinally extending inner connecting ribs 118.

The tubular steel body 112 has a wedge portion 122 which defined a part-cylindrical or concave surface 123 which connects with inwardly projecting part-cylindrical or convex surfaces 125 to form a wedging seat defined by longitudinally extending opposing wedging surfaces 126. The body 112 also has two additional part-cylindrical concave surfaces 123 which are connected by a rounded or convex surface 125 to provide the body 112 with three uniformly spaced thicker wall portions 128. The thicker wall portion 128 opposing the wedging portion 122 is provided with axially spaced threaded holes 137, and a removable roll-type stop pin 138 (FIG. 10) extends radially inwardly at the longitudinal center of the body 112. The three part-cylindrical concave surfaces 123 cooperate with the three part-cylindrical convex surfaces 125 to define an inner chamber 140 having generally a clover leaf cross-sectional configuration. Each of the threaded holes 137 receives a locking screw 142 having a pointed inner end portion 143 and a hex head portion 144 connected to the threaded portion by a reduced neck portion 146.

After the end portions 114 of the reinforcing bars 115 are inserted into the chamber 140 (FIG. 11) until the ends of the bars engage the center stop pin 138, the screws 142 are tightened with a suitable wrench, such as an air operated impact wrench, until the torque on each screw increases to a predetermined torque level, such as 400 foot pounds. At this torque level, the head portion 144 of each screw shears from the threaded portion at the neck portion 146. When the screws 142 are tightened, the pointed end portions 143 of each screw penetrates into the end portion 114 of the reinforcing bar, deforming the bar, as shown in FIG. 12. Simultaneously, the ribs 117 penetrate the wedge portion 122 of the coupler body 112 and deform the wedging surfaces 126, as shown in FIG. 12. This forms a positive high tensile strength connection of the coupler 110 to the end portion 114 of each reinforcing bar 115. As mentioned above, the tensile coupling strength of the body 112 to each end portion 114 is equal to or higher than the tensile strength of the bar 115.

Preferably, the tangent lines 148 (FIG. 11) where the concave surface 123 within the wedge portion 122 meets the adjacent convex surfaces 125, form an angle B of between 15° and 25° or about 20°. For example, with a coupler 110 constructed for size #14 reinforcing bars 115, the outer diameter of the body 112 is about 3.4 inches, the radius for each concave surface 123 is about 0.740 inch, and the radius for each convex surface 125 is about 0.797 inch. This results in the radius for each concave surface 123 being equal to between 70% and 80% of the radius for the outer surface of the reinforcing bar 115, which has a diameter of about 1.909 inches including the ribs 117. The radius for each convex surface 125 is preferably within the range of 80% to 90% of the radius for the outer diameter of the reinforcing bar.

From the drawing of the above description, it is apparent that a coupler 10 or 10' or 110 constructed in accordance with the invention, provides desireable features and advantages. For example, the non-cylindrical or diamond-shaped cross-sectional configuration of the tubular body 12 or 12' includes the V-shaped wedge portion 22 or 22' with the wedging surfaces 26, and the body 112 has the wedge portion 122 with the wedging surfaces 126. As a result, the reinforcing bars 15 or 115 are forced into the wedge portion of the body when the screws 42 or 142 are tightened so that the circumferential ribs penetrate into and deform the inner surfaces 26 or 126 of the wedge portion. The angle between the inner wedging surfaces of the wedge portion also prevents the wedging surfaces from engaging both of the longitudinal ribs on each bar which could prevent the penetration of the circumferential ribs into the wedging surfaces.

As mentioned above, the coupler 10 of the invention also uses commercially available and relatively inexpensive hardened set screws 42 which have cone-shaped or pointed tip portions 43 for penetrating the bars 15 when the screws are tightened with a commercially available preset impact wrench or torque wrench inserted into the socket head recesses 44. The screws 42 or 142 also provide a visual indication after the screws are sufficiently tightened (FIGS. 1 & 9) and the outer ends of the screws are generally flush with the outer surface of the coupler body and/or the head portions 144 are sheared from the screws 142. As shown in FIGS. 2 and 10, preferably the longitudinal spacing between adjacent screws 42 or 142 is equal to about one and one-half the major diameter of screws.

The cold-forming or forging of commercially available or standard ductile steel tubing 50 to produce the coupler body 12 or 12', also contributes to reducing the cost of producing the coupler 10. In addition, the cold-forging of the steel tubing section 50 results in work-hardening of the coupler body to provide the body with greater strength. In reference to the coupler 110, the cold-drawn or forged or extruded steel body 112 permits the use of a harder steel, and the three thicker wall portions of the body 112 provide for more thread engagement of the screws, which in turn, permit the locking screws to be tightened to a higher torque for obtaining a greater wedging action and a higher coupling strength.

While forms of coupler herein described and their method of production constitute preferred embodiments of the invention, it is to be understood that the invention is not limited to the precise methods and forms of couplers described, and that changes may be made therein without departing from the scope and spirit of the invention as defined in the appended claims.

The invention having thus been described, the following is claimed:

1. A method of making a coupler adapted for rigidly connecting adjacent end portions of opposing concrete reinforcing bars, comprising the steps of forming an elongated tubular metal body with three circumferentially spaced first wall portions having a thickness greater than second wall portions connecting the first wall portions, forming two of the first wall portions to define a longitudinally extending wedge portion having longitudinally extending and converging inner wedging surfaces adapted to engage an end portion of a reinforcing bar, forming a series of longitudinally spaced threaded holes within a first wall portion of the body and in generally opposing relation to the wedge portion, and threading a corresponding series of generally conical tip screws into the holes for penetrating the end portion of the bar and for forcing the end portion into the wedging surfaces in response to tightening of the screws.

2. A method as defined in claim 1 wherein the tubular body is formed by extruding steel tubing with the first and second wall portions.

3. A method as defined in claim 1 and including the step of forming the inner wedging surfaces of the wedge portion to define an included angle less than seventy degrees.

4. A method as defined in claim 1 and including the step of forming each of the wedging surfaces by joining a longitudinally extending concave surface to a longitudinally extending convex surface.

5. A method as defined in claim 1 wherein the tubular body is formed by compressing a section of cylindrical ductile tubing.

6. A method as defined in claim 1 wherein the tubular body is formed to define an inner chamber having generally a three leaf clover cross-sectional configuration.

7. A method as defined in claim 1 wherein the tubular body is formed with a cylindrical outer surface.

8. A method of making a coupler for rigidly connecting opposing end portions of concrete reinforcing bars each having a generally cylindrical outer configuration with outwardly projecting ribs, comprising the steps of forming an elongated tubular metal body including a longitudinally extending wedge portion formed by longitudinally extending and converging inner wedging surfaces, forming a series of longitudinally spaced threaded holes within the body in generally opposing relation to the wedge portion, inserting the opposing end portions of the bars into the tubular body with the ribs on the bars engaging the converging inner wedging surfaces, and threading a corresponding series of generally conical tip screws into the holes for penetrating the end portions of the bars and for forcing the end portions and ribs into the converging inner wedging surfaces in response to tightening of the screws.

9. A method as defined in claim 8 wherein each of the wedging surfaces is formed substantially flat.

10. A method as defined in claim 8 and including the step of forming each of the wedging surfaces by joining a longitudinally extending generally concave surface between two longitudinally extending generally convex surfaces.

11. A method as defined in claim 8 wherein the tubular body is formed by compressing a section of cylindrical ductile tubing to provide the body with non-cylindrical inner and outer surfaces.

12. A method as defined in claim 8 and including the step of forming the tubular body with circumferentially spaced first wall portions having a thickness greater than second wall portions connecting the first wall portions with the first wall portions defining the wedging surfaces and the threaded holes.

13. A method as defined in claim 12 wherein the tubular body is formed to define an inner chamber having generally a three leaf clover cross-sectional configuration.

14. A method as defined in claim 8 wherein the tubular body is formed with a cylindrical outer surface.

\* \* \* \* \*